United States Patent [19]

Wetters et al.

[11] 4,336,473

[45] Jun. 22, 1982

[54] ELECTRIC MOTOR

[75] Inventors: Dale D. Wetters; Gene L. Meyer, both of Bluffton, Ind.

[73] Assignee: Franklin Electric Co., Inc., Bluffton, Ind.

[21] Appl. No.: 91,074

[22] Filed: Nov. 5, 1979

[51] Int. Cl.³ .............................................. H02K 5/10
[52] U.S. Cl. ...................................... 310/88; 417/373; 310/57
[58] Field of Search ...................... 417/373, 177, 415; 310/88, 89, 90, 85, 86, 87, 64, 65, 54, 67, 57, 63, 62

[56] References Cited

U.S. PATENT DOCUMENTS

| | | | |
|---|---|---|---|
| 2,918,207 | 12/1959 | Moore | 417/373 |
| 3,060,860 | 10/1962 | Schaefer | 417/373 |
| 3,394,659 | 7/1968 | Van Alen | 310/88 X |
| 3,766,453 | 10/1973 | Schenk et al. | 310/88 |
| 3,862,443 | 1/1975 | Edick | 310/57 |
| 4,088,424 | 5/1978 | Hyatt et al. | 417/373 X |
| 4,198,192 | 4/1980 | Webb | 417/373 |

Primary Examiner—Donovan F. Duggan
Attorney, Agent, or Firm—Merriam, Marshall & Bicknell

[57] ABSTRACT

This disclosure relates to an electric motor of a motor-pump assembly, the motor including an improved end bell. The end bell is located between the motor and the pump of the assembly and forms a common wall between them. The end bell is made of a material having a relatively high coefficient of thermal conductivity, and a cover made of a material having a relatively low coefficient of thermal conductivity separates the pumped liquid from the end bell. A bearing is supported by the end bell, and condensation around the bearing is prevented by the cover and by means for circulating relatively warm air around the bearing.

9 Claims, 3 Drawing Figures

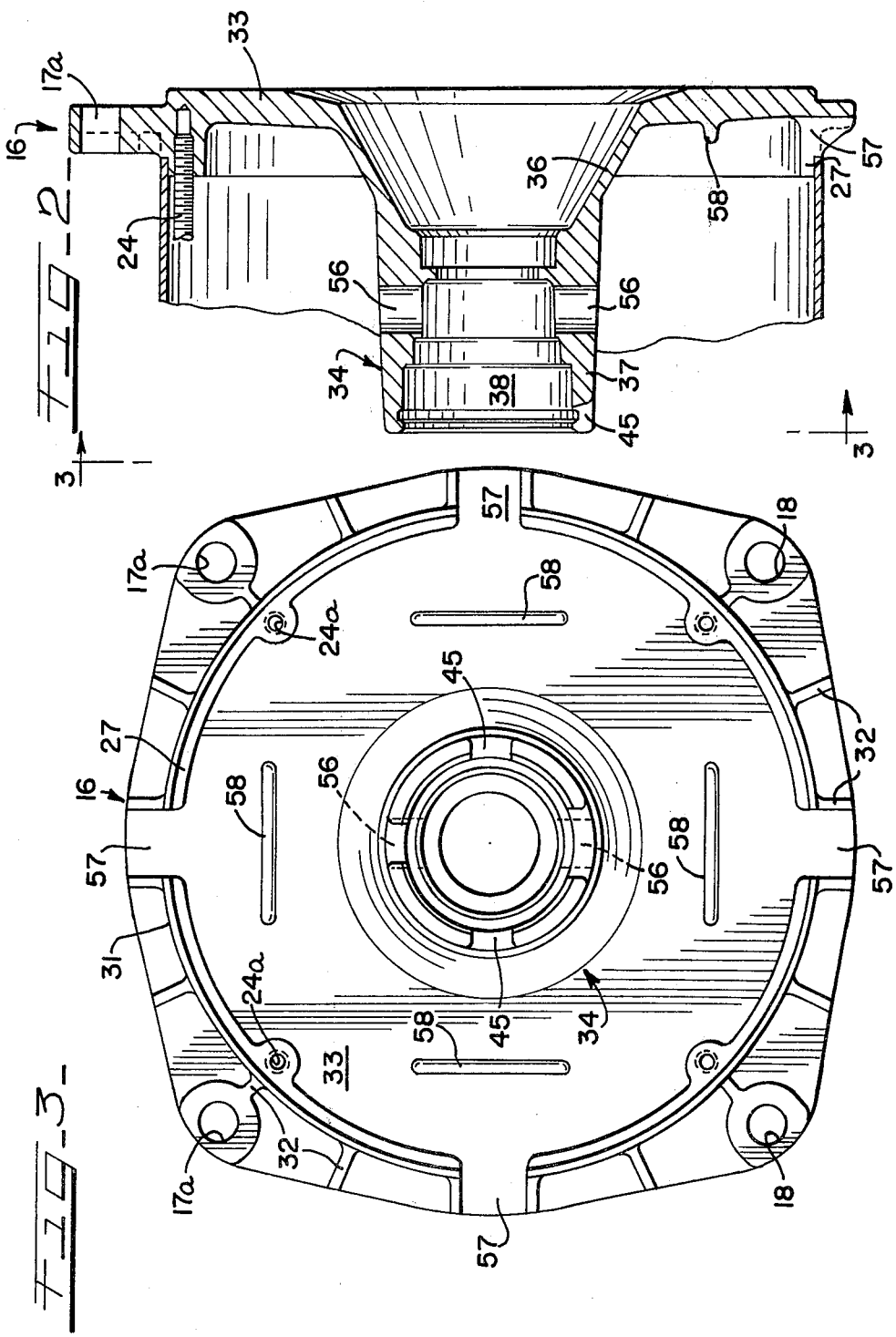

ELECTRIC MOTOR

A well known type of motor-pump assembly includes an end bell that separates the pump cavity from the interior of the motor. The end bell further supports a motor bearing. Where an assembly of this character is utilized to pump a relatively cold liquid, a problem has arisen because condensation forms within the motor interior around the bearing causing failure of the bearing. This problem arises when the liquid being pumped has a temperature below the dew point of the air within the motor interior, the end bell being made of metal and its thermal conductivity being sufficient to produce the condensation.

U.S. Pat. No. 3,060,860 discusses the foregoing problem and it describes a solution to the condensation problem. The solution described in the patent is to isolate the bearing mount portion of the end bell by forming the end bell with a number of arms or spokes which support the bearing and reduce the thermal conductivity to the bearing. Further, the patent describes the use of a slinger, and a gasket is provided between the end bell and the casing of the pump.

While the motor described in the foregoing patent has had widespread use in residential water supply systems and in swimming pool filter systems, problems have been encountered particularly in the swimming pool filter systems. The end bell has been made of cast iron, and the highly chlorinated swimming pool water has corroded the end bell, causing rust to be pumped into the swimming pool water. Two solutions to this problem have been attempted, one including an epoxy coating over the surface of the end bell to prevent the chlorinated swimming pool water from contacting the cast iron end bell, and the other including an extended gasket that separates the water from the end bell.

In recent years, die cast aluminum has been commonly used in place of cast iron as the end bell material. While aluminum offers a cost reduction as compared with cast iron, it has not been satisfactory for the end bell described above because the coefficient of thermal conductivity of aluminum is much higher than that of cast iron, and consequently condensation would be a serious problem even if the arms or spokes were provided.

It is a general object of the present invention to provide an improved motor which avoids the foregoing problems.

Apparatus in accordance with the present invention comprises an improved motor including an end bell which is located between the motor and the pump casing of a motor-pump assembly, the end bell being made of a material that has a relatively high coefficient of thermal conductivity, such as aluminum. The end bell includes a hub that supports a bearing of the motor, and a common wall that separates the motor interior from the pump cavity. A cover made of a material having a relatively low coefficient of thermal conductivity extends across the wall of the end bell and it also serves as a gasket, the cover forming a layer of thermal insulation. A slinger and drain holes are provided to prevent leakage from reaching the bearing, and the motor includes means for circulating relatively warm air through the interior of the motor around the bearing.

The foregoing and other objects and advantages of the present invention will be more fully understood from the following detailed description taken in conjunction with the accompanying figures of the drawings, wherein:

FIG. 2 is an enlarged sectional view of the end bell; and

FIG. 3 is a view taken on the line 3—3 of FIG. 2.

Figure 1:
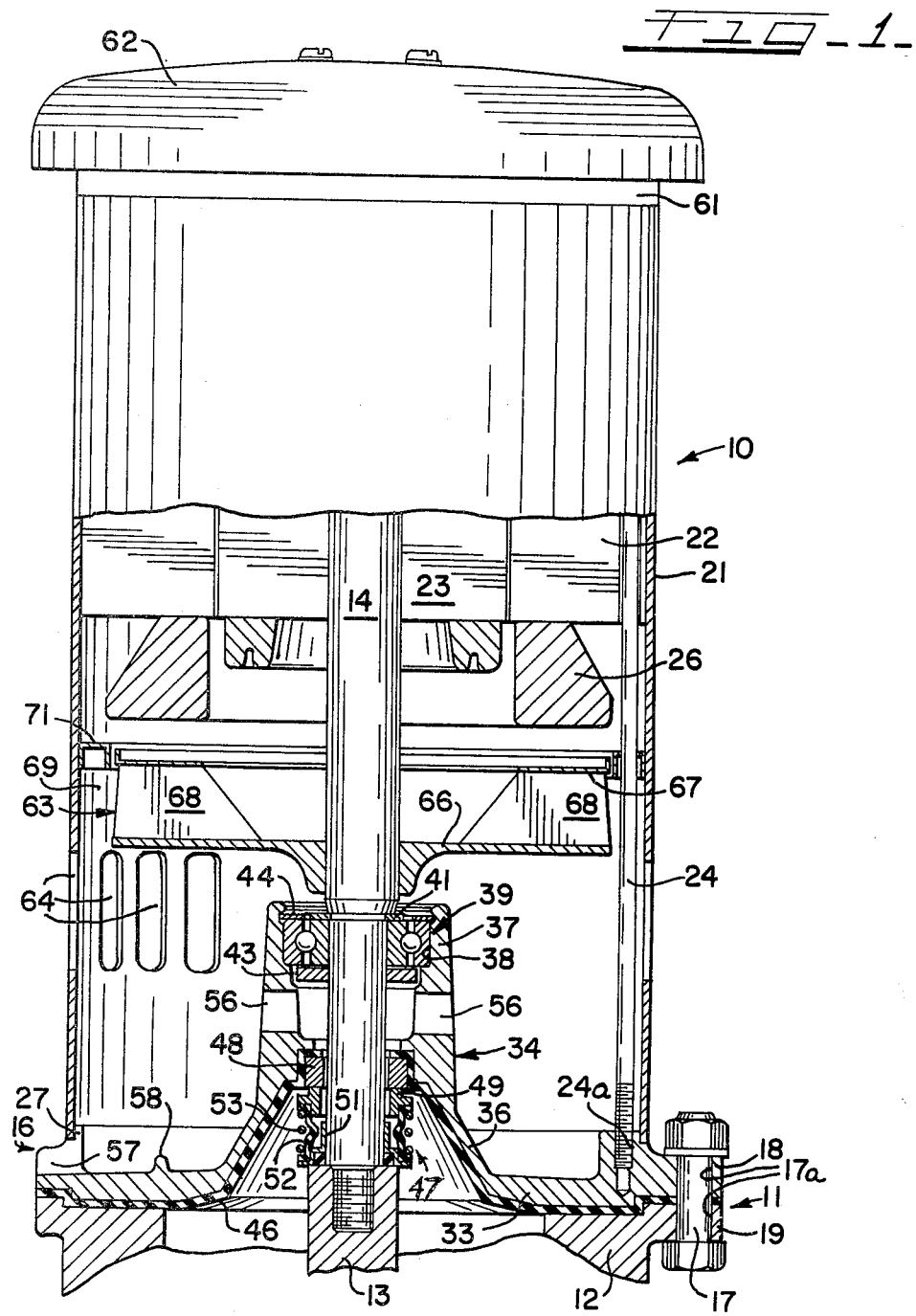
FIG. 1 is a view partially in section of a motor-pump assembly including an end bell, in accordance with the present invention.

The specific example of the invention illustrated in FIG. 1 of the drawings includes an electric motor 10 that is connected to drive a pump 11, the pump 11 being conventional in construction and therefore being only partially shown. The pump includes a casting 12 and a pump impeller connected to and driven by the motor drive shaft 14. The pump casing 11 is rigidly secured to a motor end bell 16 by a plurality of circumferentially-spaced bolts 17 that are positioned through holes 17a formed in flanges 18 and 19 on the end bell 16 and on the pump casing 11, respectively. The end bell 16 will be described in more detail hereinafter.

The electric motor 10 further includes an outer cylindrical shell 21 that encloses a stator 22 and a rotor 23. The stator 22 is secured to the outer shell 21 and the rotor 23 is secured to the motor drive shaft 14. A plurality of circumferentially-spaced through bolts 24 extend through holes formed in the stator 22 and are threaded in holes 24a in the end bell 16 and secure the stator 22 and shell 21 assembly to the end bell 16. The stator 22 further includes stator windings 26 and the rotor 23 may be a conventional squirrel cage type. The end bell 16 has a circular machined shoulder and flange 27 for alignment of the stator 22 and the shell 21 assembly to the end bell 16.

With reference to FIGS. 1 and 3, the circular machined shoulder and flange 27 is in the upper side of a circular ridge 31 formed near the outer periphery of the end bell 16. The flange 18 extends radially outwardly from the ridge 31, and a series of radially extending ribs 32 extend between the ridge 31 and the flange 18 in order to strengthen the flange. As best shown in FIG. 3, the holes 17a for the bolts 17 are formed through the flange 18. The end bell 16 further includes a generally flat center part or wall 33 that extends between the ridge 31 and a central bearing support hub 34 of the end bell 16. The hub 34 (FIGS. 1 and 2) includes a lower cone-shaped portion 36 and an upper generally cylindrical bearing support part 37. A circular opening 38 is formed through the bearing support part 37 and through the cone-shaped part 36, and the drive shaft 14 of the motor extends through the opening 38. A ball bearing 39 is mounted within the opening 38 adjacent the upper end of the bearing support part 37 and supports the drive shaft 14 on the end bell 16. The ball bearing 39 is placed on shaft 14 with a washer 41 assembled between the ball bearing and a shaft shoulder. The washer 41 is used to provide a shoulder for the bearing to seat against. The ball bearing is secured to the end bell 16 using a snap ring 44 assembly, and notches 45 (FIGS. 2 and 3) may be formed in the hub 34 for assembling the snap ring. Immediately below the ball bearing 39 is a slinger 43 which is secured to and rotates with the motor drive shaft 14.

Fastened across the lower or pump side of the end bell 16 is a combination cover and gasket 46 which extends from between the two flanges 18 and 19 to the opening 38 for the shaft 14. Thus, the cover 46 completely covers the pump side of the end bell 16 and separates the end bell from the pump casing 12, and it prevents the liquid being pumped from contacting the end bell 16. The cover is a relatively thick layer of a material, such as neoprene rubber, that has a relatively low coefficient of thermal conductivity.

A rotary seal assembly 47 is provided to prevent leakage of the liquid through the opening 38. The seal assembly 47 includes a stationary seal part 48 that presses into the cover 46 around the opening 38, and a rotating seal part 49 that turns with the shaft 14. A sleeve part 51 is secured to the drive shaft 14 below the seal parts 48 and 49, and a flexible diaphragm 52 connects the seal part 51 with the rotating seal part 49. A compression spring 53 holds the two seal parts 48 and 49 in tight engagement. As best shown in FIG. 1, the interior of the cone-shaped part 36 of the end bell 16 receives the shaft seal 47.

With reference to FIGS. 1 and 3, a plurality of radially extending holes or openings 56 are formed through the wall of the hub 34 between the seal 47 and the slinger 43. Consequently, any leakage of the liquid through the rotary seal 47 will flow radially out of the holes 56 and onto the upper surface of the center part 33 of the end bell 16. The slinger 43 will prevent any leakage from creeping up the shaft 14 and reaching the ball bearing 39. Further, any leakage collecting on the center part 33 of the end bell 16 will flow out of the motor interior through a plurality of drain holes 57 formed through the ridge 31. Preferably four equally spaced drain holes 57 are provided to permit drainage whether the motor is mounted vertically or horizontally. Preferably, short projections or ribs 58 (best shown in FIGS. 2 and 3) are provided in back of the drain holes 57 to provide end bell strength.

Means are also provided for circulating heated air through the interior of the motor around the bearing. In conventional motors including means for circulating cooling air through the interior of the motor, the air is most frequently drawn into the motor interior from the lower end and exhausted from adjacent the upper end. In accordance with the present invention, however, the air is drawn into the motor interior from the upper end and exhausted adjacent the lower end. The air enters the motor interior through a plurality of ventilation openings (not shown) formed in the upper end of the shell 21 or in the upper end part 61. In the present specific example, the openings are formed in the upper end part 61 and a cover 62 over the openings forms a rain or drip shield. A fan 63 is secured to the shaft 14 between the rotor 23 and the hub 34 and rotation of the rotor 23 during operation of the motor and the pump causes the fan 63 to draw air into the motor interior through the ventilation openings. The air flows downwardly through the motor interior around the stator 22 and the rotor 23, and since these motor parts become heated during operation, the air is heated as it flows downwardly. A series of circumferentially-spaced slots or openings 64 are formed in the shell 21 adjacent the fan 63 and at about the level of the bearing 39. The fan 63 includes a flat disc part 66, an annular plate 67 spaced above the part 66, and a plurality of spaced blades 68 that extend between the parts 66 and 67. There is a clearance space 69 between the shell 21 and the fan 63, and an annular baffle 71 is mounted in this space 69 and fastened to the shell 21. When the rotor shaft 14 and the fan 63 rotate, the air is drawn downwardly through the motor and through the annular plate 67, and the air is thrown radially outwardly by the blades 68. The air flows into the bearing area and out of the motor through the slots 64. The part 66 prevents any water within the motor enclosure from dripping downwardly onto the bearing. Prior art motors have been provided having openings therein (but with a drip-proof enclosure) and means for moving air through the motor in order to meet the winding and bearing temperature specifications. In accordance with this invention, condensation around the motor bearing is avoided by the use of the cover 46 used as a temperature barrier which keeps the bearing 39 and surrounding support hub above the dew point temperature under normally encountered operating conditions. However, under adverse operating conditions, such as the liquid pumped being at about 40 F and the ambient air being at about 90% relative humidity and at a temperature of approximately 90 F, the warmed air ensures the prevention of condensation. As mentioned, the ambient air is moved into the motor at the opposite end from the bearing and around the bearing and then out of the motor. The air moving around the bearing, since it is warmed by the hot motor parts, provides an additional factor which helps to keep the bearing and hub temperature above the dew point.

It will be apparent from the foregoing that a novel, useful and advantageous construction has been provided. The end bell 16 may be die cast of a material, such as aluminum or an aluminum alloy, having a high coefficient of thermal conductivity but, nevertheless, the provision of the cover 46 prevents a relatively cold liquid being pumped from contacting the end bell 16. The cover 46 has a relatively low coefficient of thermal conductivity and forms a layer of thermal insulation, thereby preventing cooling of the end bell 16. A substantial cost reduction as compared with the structure shown in U.S. Pat. No. 3,060,860 is thereby obtained because it is possible to use a less expensive material in the manufacture of the end bell, and it is not necessary to form the spokes or arms shown in the patent. Further, the motor preferably also includes the described air flow system to cause heated air to flow around the motor bearing, thereby keeping the bearing support hub and the ball bearing temperature above the dew point temperature even under severe operation conditions such as when pumping 40 F water with the motor operating in 90 F ambient temperature at 90% relative humidity. The arrangement of the drainage holes 56 and 57 and the slinger 43 prevents any shaft seal leakage from reaching the bearing.

We claim:

1. An electric motor including a drive shaft for driving a liquid pump, comprising a motor shell, an end bell fastened to said shell adjacent one end thereof, said end bell and said shell forming a rotor cavity and said shaft extending through said cavity, said end bell comprising a wall having an opening therein and said drive shaft extending through said opening for connection to said pump, a bearing within said cavity and mounted on said wall and supporting said shaft, said wall forming a common wall between the motor and the pump and the wall having a motor side and a pump side, said motor cavity being on said motor side and a liquid being pumped being on said pump side, said end bell being made of a material having a relatively high coefficient of thermal conductivity, and a cover having a relatively low coefficient of thermal conductivity extending across said pump side of said end bell and forming a layer of thermal insulation between said end bell and a liquid flowing through the pump, thereby preventing condensation around said bearing.

2. An electric motor as in claim 1, wherein said end bell includes a bearing support hub formed on said motor side, and said motor further includes said bearing for said drive shaft mounted on said hub, and means for circulating relatively warm air around said bearing.

3. An electric motor as in claim 2, wherein said hub has a plurality of drain holes formed therein, and said end bell has a plurality of drain holes formed therein adjacent said shell.

4. An electric motor as in claim 2, wherein said motor includes stator and rotor windings, and said air circulating means comprises a fan fastened to said drive shaft for circulating air past said windings and then past said bearing.

5. An electric motor as in claim 1, wherein said end bell comprises said wall and a bearing support hub at substantially the center of said wall, said opening being formed through said hub, and further including said shaft bearing fastened to said hub and spaced from said wall, said hub having at least one drain hole formed therethrough, said drain hole being located between said wall and said bearing.

6. An electric motor as in claim 5, wherein said cover has an opening formed therethrough in alignment with said opening in said end bell and said shaft extends through said openings, and further including a rotary seal between said shaft and said cover.

7. Apparatus for use in an electric motor adapted to be connected to drive a pump that includes a pump casing, the motor including a stator, a rotor within the stator, and a drive shaft secured to the rotor, said apparatus comprising an end bell having a motor side and a pump side, means adapted to secure the stator to the end bell and means adapted to secure the pump casing to the end bell, said end bell including a generally flat wall portion and a bearing hub portion at substantially the center of said wall portion on said motor side, said hub portion having a shaft opening formed therein and said opening being adapted to receive said shaft therethrough, a bearing fastened to said hub portion at a location that is spaced from said wall portion, said bearing being adapted to support said shaft, said hub portion having at least one drain opening formed therethrough between said wall portion and said bearing, and a cover extending across said pump side of said end bell, said end bell being made of an aluminum composition having a relatively high coefficient of thermal conductivity and said cover being relatively thick and being made of a material having a relatively low coefficient of thermal conductivity.

8. Apparatus as in claim 7, wherein said cover extends from said opening to between said end bell and the pump casing and thereby forms a combined cover and gasket.

9. Apparatus as in claim 8, and further including a rotary seal between said cover and the shaft on the pump side of the end bell.

* * * * *